US010140507B2

(12) United States Patent
Srivastava

(10) Patent No.: US 10,140,507 B2
(45) Date of Patent: Nov. 27, 2018

(54) APPARATUS AND METHOD FOR RECOGNIZING HAND GESTURES IN A VIRTUAL REALITY HEADSET

(71) Applicant: Samsung Electronics Co., Ltd., Gyeonggi-do (KR)

(72) Inventor: Gaurav Srivastava, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/982,299

(22) Filed: Dec. 29, 2015

(65) Prior Publication Data

US 2017/0185830 A1    Jun. 29, 2017

(51) Int. Cl.
| | | |
|---|---|---|
| *G06K 9/00* | (2006.01) | |
| *G02B 27/01* | (2006.01) | |
| *G06F 3/00* | (2006.01) | |
| *G06F 3/01* | (2006.01) | |
| *G06T 19/00* | (2011.01) | |
| *G06F 3/03* | (2006.01) | |
| *G09G 5/00* | (2006.01) | |

(52) U.S. Cl.
CPC ....... *G06K 9/00355* (2013.01); *G02B 27/017* (2013.01); *G06F 3/005* (2013.01); *G06F 3/012* (2013.01); *G06F 3/017* (2013.01); *G06F 3/0304* (2013.01); *G06T 19/006* (2013.01); *G02B 2027/014* (2013.01); *G02B 2027/0138* (2013.01)

(58) Field of Classification Search
USPC ....... 382/100, 103, 106–107, 151, 154, 162, 382/168, 173, 181, 209, 219, 232, 254, 382/274, 276, 285–291, 114, 305, 312; 345/633, 156; 348/46; 600/301
See application file for complete search history.

(56) References Cited

U.S. PATENT DOCUMENTS

| | | | | |
|---|---|---|---|---|
| 2008/0013793 A1* | 1/2008 | Hillis | ................. | G03H 1/0005 382/114 |
| 2012/0249416 A1* | 10/2012 | Maciocci | ................ | G06F 3/011 345/156 |
| 2012/0249741 A1* | 10/2012 | Maciocci | ................ | G06F 3/011 348/46 |

(Continued)

OTHER PUBLICATIONS

Foreign Communication from Related Counterpart Application; European Patent Application No. 16181893.5; Extended European Search Report dated May 8, 2017; 7 pages.

(Continued)

*Primary Examiner* — Seyed Azarian

(57) ABSTRACT

A virtual reality (VR) headset configured to be worn by a user. The VR headset comprises: i) a forward-looking vision sensor for detecting objects in the forward field of view of the VR headset; ii) a downward-looking vision sensor for detecting objects in the downward field of view of the VR headset; iii) a controller coupled to the forward-looking vision sensor and the downward-looking vision sensor. The controller is configured to: a) detect a hand in a first image captured by the forward-looking vision sensor; b) detect an arm of the user in a second image captured by the downward-looking vision sensor; and c) determine whether the detected hand in the first image is a hand of the user.

19 Claims, 5 Drawing Sheets

(56) References Cited

U.S. PATENT DOCUMENTS

2014/0243614 A1* 8/2014 Rothberg ............... A61B 8/13
                                                    600/301
2015/0199824 A1   7/2015 Kim et al.
2015/0241959 A1*  8/2015 Abovitz ............. G06K 9/00671
                                                    345/633
2015/0312561 A1* 10/2015 Hoof ................ G02B 27/0172
                                                    348/46

OTHER PUBLICATIONS

Thelen et al.; "Enhancing Large Display interaction with User Tracking Data"; Proceedings of the International Conference on Computer Graphics and Virtual Reality (CGVR); Jan. 1, 2012; 6 pages.

Lau, D.; "Leading Edge Views: 3-D Imaging Advances Capabilities of Machine Vision: Part 1"; retrieved from the Internet: URL: http://www.vision-systems.com/articles/print/volume-17/issue-4/departments/leading-edge-views/3-d-imaging-advances-capabilities-of-machine-vision-part-i.html [retrieved on Feb. 11, 2016]; 7 pages.

\* cited by examiner

APPARATUS AND METHOD FOR RECOGNIZING HAND GESTURES IN A VIRTUAL REALITY HEADSET

TECHNICAL FIELD

The present application relates generally to virtual reality (VR) headsets and, in particular, to a system for correctly identifying the hand gestures of the legitimate user of a VR headset.

BACKGROUND

Virtual reality (VR) equipment—also called augmented reality (AR) equipment—is becoming increasingly popular, both for entertainment uses, training uses, and commercial uses. A user experiences virtual reality by wearing a VR head-mounted display (HMD) or similar equipment and operating a virtual reality software application that controls the VR equipment. The VR headset projects three-dimensional (3D) images of a virtual world that may appear quite real to the user.

One of the key features of a VR headset is the ability to recognize and identify the hand gestures of the user of the VR headset. However, when the front vision sensor on the VR headset detects a hand in the scene for the purpose of identifying user hand gestures, it is difficult to determine whether the hand belong to the legitimate user of the VR headset or to an intruder in the field of vision of the front vision sensor. The default assumption of conventional VR headsets is that a detected hand belongs to the actual user (i.e., the person wearing and operating the VR device). But it is possible that another person (i.e., an "intruder") may accidentally or intentionally waves his or her hand in front of the VR device. The intruder's detected hand gesture(s) may trigger undesirable effects on the user interface causing an unpleasant experience to the main user.

For example, the main user may be editing a document on a virtual reality desktop and the intruder hand gesture may close the document. Likewise, the main user may be finishing up an online purchase using a VR device when the intruder hand gesture clicks the BACK button. Or, the main user may be watching a movie in the VR device and the intruder hand gesture may click the STOP or CLOSE button on the movie window. In sum, there are numerous situations where the intentional or accidental hand gesture of an intruder may cause undesirable experience for the main or legitimate user.

Therefore, there is a need in the art for an improved apparatus and method for identifying legitimated hand gesture of the user of a virtual reality device.

SUMMARY

To address the above-discussed deficiencies of the prior art, it is a primary object to provide a virtual reality (VR) headset configured to be worn by a user. In a preferred embodiment of the disclosure, the VR headset comprises: i) a forward-looking vision sensor for detecting objects in the forward field of view of the VR headset; ii) a downward-looking vision sensor for detecting objects in the downward field of view of the VR headset; iii) a controller coupled to the forward-looking vision sensor and the downward-looking vision sensor. The controller is configured to: a) detect a hand in a first image captured by the forward-looking vision sensor; b) detect an arm of the user in a second image captured by the downward-looking vision sensor; and c) determine whether the detected hand in the first image is a hand of the user.

In one embodiment, the controller determines whether the detected hand in the first image is the hand of the user by comparing a relative position of the detected hand in the first image and a relative position of the detected arm of the user in the second image.

In another embodiment, the controller determines whether the detected hand in the first image is the hand of the user by comparing a relative movement of the detected hand in the first image and a relative movement of the detected arm of the user in the second image.

In still another embodiment, the controller determines whether the detected hand in the first image is the hand of the user by comparing a relative alignment of the detected hand in the first image and a relative alignment of the detected arm of the user in the second image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged virtual reality headset.

In the disclosure below, the phrase "virtual reality" will be used generically for both virtual reality and augmented reality in order to simplify the descriptions that follow. Also, the following terms have the following meanings unless otherwise specified: i) "vision sensor" refers to any video camera (e.g., RGB camera), depth sensor, or motion detection circuitry device; ii) "main user" or "user" refers to the person actually wearing and operating the virtual reality (VR) head mounted display (HMD) or headset; and iii) "intruder" refers to any person other than the user whose hand gestures are intentionally or accidentally triggering undesirable effects on the VR user interface of the HMD/headset.

Figure 1A:
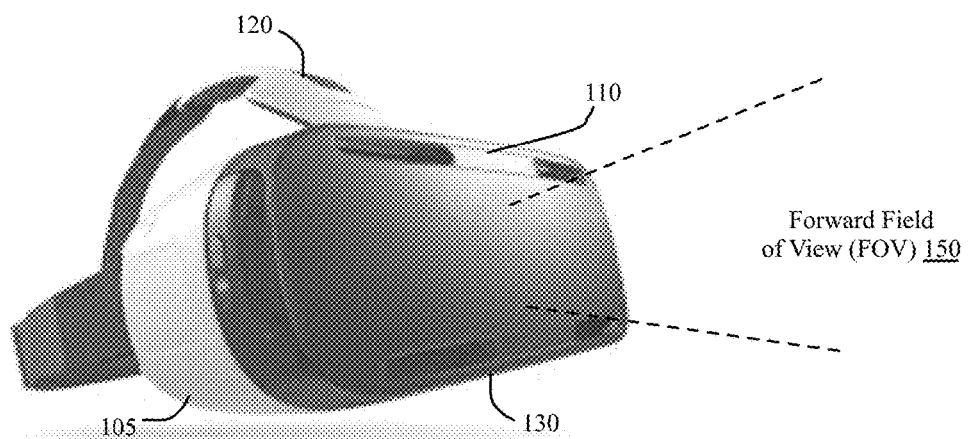
FIG. 1A is a perspective view of a virtual reality (VR) headset according to one embodiment of the disclosure.
Figure 1B:
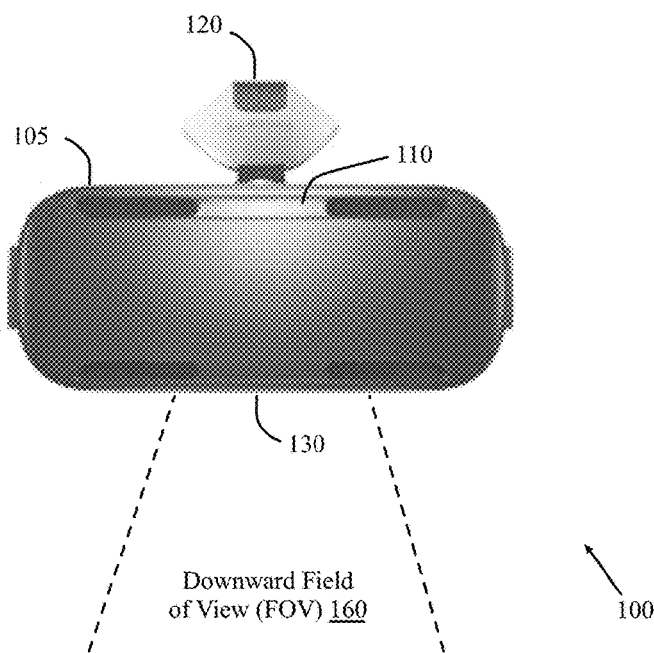
FIG. 1B is a front view of a virtual reality (VR) headset according to one embodiment of the disclosure.

FIG. 1A is a perspective view of virtual reality (VR) headset 100 according to one embodiment of the disclosure. FIG. 1B is a front view of virtual reality (VR) headset 100 according to one embodiment of the disclosure. VR headset 100 comprises chassis (or housing) 105, forward vision sensor 110, head strap 120, and downward vision sensor 130. Chassis 105 houses the electronics of VR headset 100. A user places VR headset 100 on his or her head and tightens head strap 120 to hold VR headset 100 in place. Forward vision sensor 110 captures forward field of view (FOV) 150 and displays forward FOV 150 on the internal display of VR headset 100. The user may then view on the internal display any objects in the forward FOV 150.

When the forward vision sensor 110 and the internal processor(s) of VR headset 100 detect a hand in forward FOV 150 for the purpose of determining hand gestures, it may be difficult to determine whether the hand belongs to the main user or to an intruder. It is necessary to prevent a hand gesture from an intruder from causing undesirable interference to the user interface. The present disclosure provides a method of distinguishing legitimate user hand gestures from intruder hand gestures by using downward vision sensor 130, which captures downward field of view (FOV) 160. Downward vision sensor 130 and the internal processor(s) of VR headset 100 are operable to detect and to identify the arm(s) of the user in downward FOV 160 and then to correlate and/or to associate the user hand movements with the user arm movements. In this way, VR headset 100 is capable of determining if a detected hand in the forward FOV 150 belongs to the legitimate user of VR headset 100 or to an intruder. Once this determination is made, the internal processor(s) of VR headset 100 will only process hand gesture commands from the user and will ignore hand gestures from an intruder.

Figure 2:
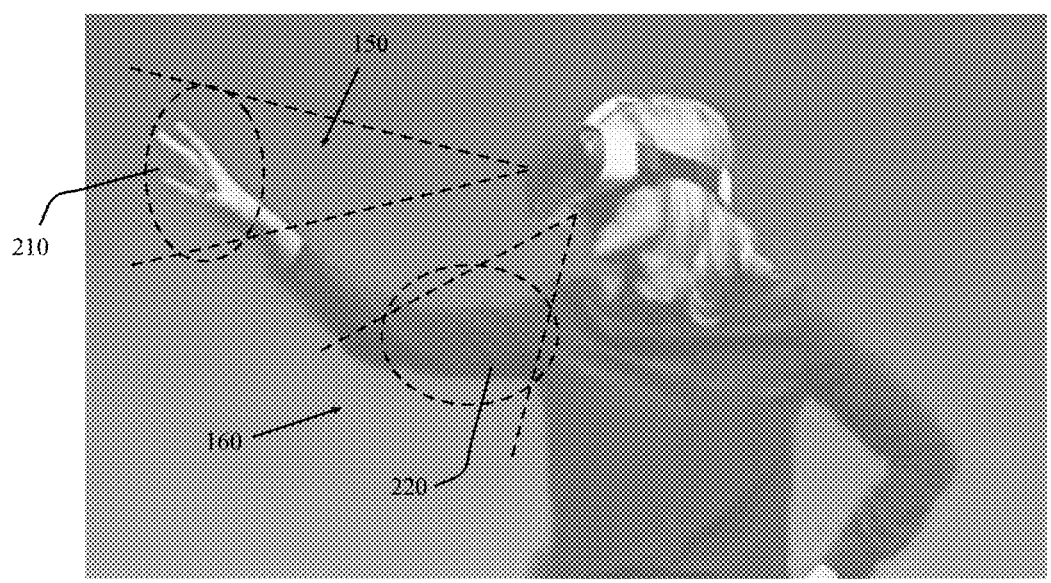
FIG. 2 illustrates a hand gesture detection operation of a virtual reality (VR) headset according to one embodiment of the disclosure.

FIG. 2 illustrates a hand gesture detection operation of virtual reality (VR) headset 100 according to one embodiment of the disclosure. In FIG. 2, the user extends her arm and hand forward to interact with object(s) in the virtual world. Forward vision sensor 110 detects user hand 210 in forward FOV 150 and downward vision sensor 130 detects user arm 220 in downward FOV 160. VR headset 110 then determines whether user hand 210 belongs to the user by comparing the alignments and/or positions of user hand 210 and user arm 220. VR headset 110 may also determine whether user hand 210 belongs to the user by comparing the relative movements of user hand 210 and user arm 220. The tracked movements may include left-right (lateral) movement of the hands and arms, up-down (vertical) movement of the hands and arms, and/or forward-backward (extension) movements of the hands and arms away from or toward the body of the user.

Figure 3:
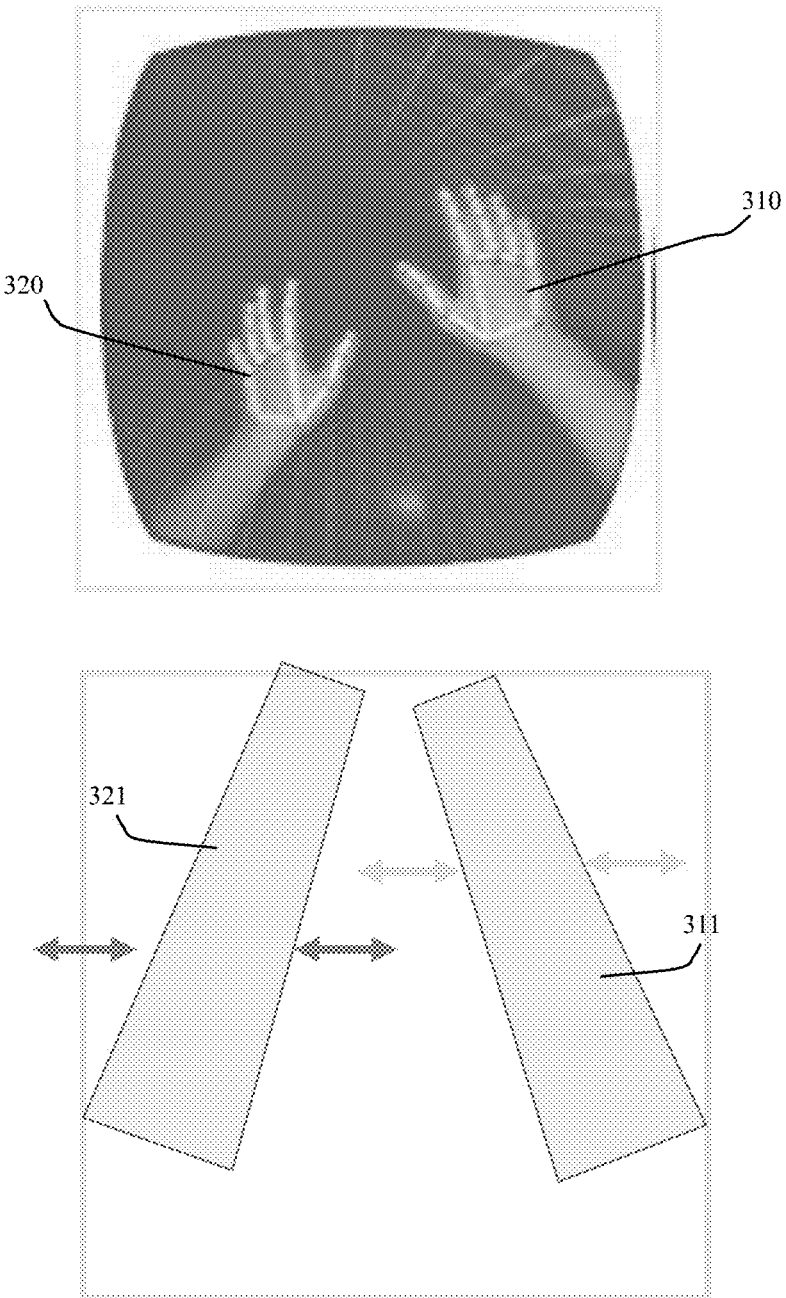
FIG. 3 illustrates detected hands in the field of view of the forward-looking vision sensor and detected arms in the field of view of the downward-looking vision sensor of a virtual reality (VR) headset according to one embodiment of the disclosure.

FIG. 3 illustrates detected hands 310 and 320 in forward FOV 150 of forward vision sensor 110 and detected arms 311 and 321 in the downward FOV 160 of downward vision sensor 130 of virtual reality (VR) headset 100 according to one embodiment of the disclosure. Generally, the user will only see detected hands 310 and 320 in forward FOV 150 on the internal display of VR headset 100. Detected arms 311 and 321 are only seen and analyzed by the internal processor(s) of VR headset 100. In FIG. 3, the lateral movements of detected arms 311 and 321 (indicted by left-right arrows) may be correlated with similar lateral movements of detected hands 310 and 320, thereby identifying detected hands 310 and 320 as the hands of the user of VR headset 100 and not the hands of an intruder.

Figure 4:
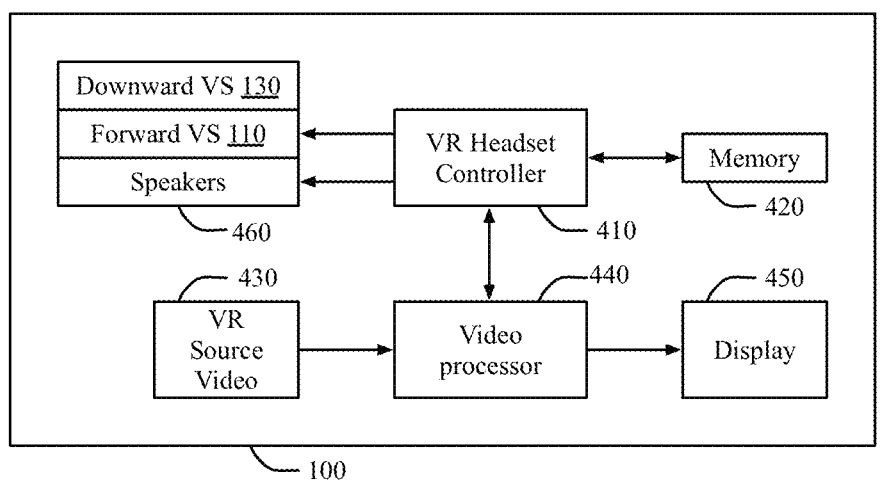
FIG. 4 is a schematic block diagram of a virtual reality (VR) headset according to one embodiment of the disclosure.

FIG. 4 is a schematic block diagram of virtual reality (VR) headset 100 according to one embodiment of the disclosure. VR headset 100 comprises forward vision sensor (VS) 110 and downward vision sensor (VS) 130. VR headset 100 further comprises VR headset controller 410, memory 420, VR source video 430, video processor 440, display 450, and speakers 460. In an exemplary embodiment, forward VS 110 and downward VS 130 may comprise conventional video cameras (e.g., RGB video cameras).

VR headset controller 410 is a microprocessor or microcontroller that controls the overall operation of VR headset 410 by executing an operating system program and one or more application programs stored in memory 420. Video processor 440 receives source video from VR source video 430, which video processor 440 then displays on one or more screens of display 450. VR source video 430 may be an external VR video player coupled wirelessly or by wireline to VR headset 410. Alternatively, VR source video 430 may be an internal memory (including a part of memory 420), in which VR video content is stored. In camera mode, VR headset controller 410 directs the real-world outputs of forward VS 110 and downward VS 130 to video processor 440 so that the user can see the real-world around the user on display 450, as well as augmented reality (AR) video content.

According to the principles of the disclosure, VR headset controller 410 is configured to direct video processor 440 to detect the hand(s) of the user in forward FOV 150 in the video output of forward VS 110 and to detect the arm(s) of the user in downward FOV 160 in the video output of downward VS 130. VR headset controller 410 is further configured to direct video processor 440 to correlate and/or to associate the user hand movements with the user arm movements. In this way, video processor 440 is capable of determining if a detected hand in forward FOV 150 belongs to the legitimate user of VR headset 100 or to an intruder.

Figure 5:
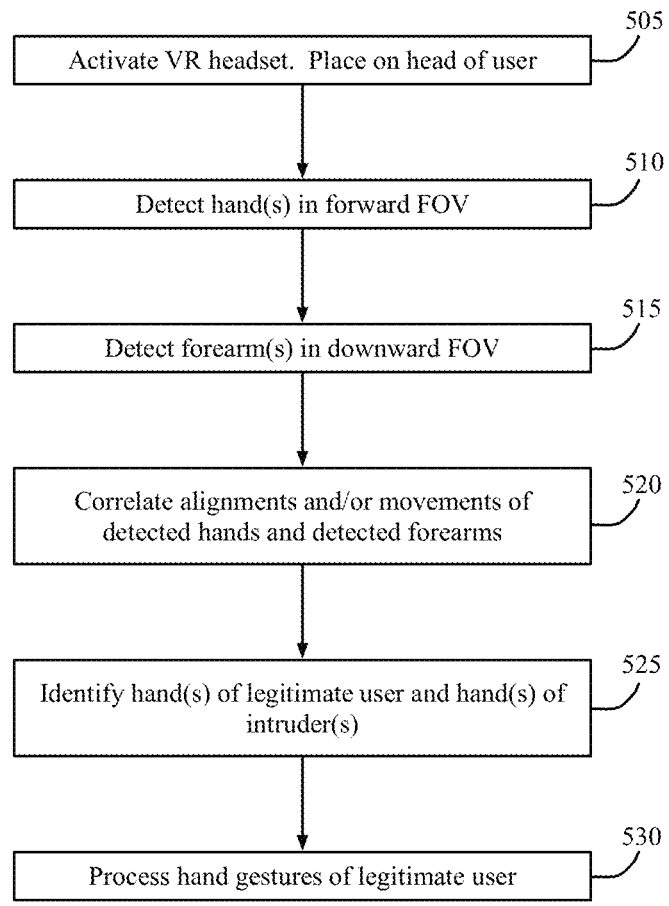
FIG. 5 is a flow diagram illustrating the operation of a virtual reality (VR) headset according to one embodiment of the disclosure.

FIG. 5 is a flow diagram illustrating the operation of virtual reality (VR) headset 100 according to one embodiment of the disclosure. Initially, the user activates VR headset 100 and places VR headset 100 on his or her head (step 505). After activation, the user may launch an application that may be controlled by user hand gestures. In response, video processor 440 detects one or more hand(s)

in forward FOV 150 (step 510). Video processor 440 also detects a portion (e.g., a forearm) of at least one arm of the user in downward FOV 160 (step 515).

Video processor 440 then attempts to determine if a detected hand in forward FOV 150 is the hand of the user or an intruder. Video processor 440 may do this by comparing and analyzing detected objects in forward FOV 150 and downward FOV 160 in order to correlate the alignments and/or movements of a detected hand(s) and a detected forearm(s) (step 520). From this comparison, video processor 440 identifies the hand(s) of the legitimate user of VR headset 100 and ignores the detected hand(s) of intruder(s) (step 525). Thereafter, video processor 440 and/or VR headset controller 410 process the hand gestures of legitimate user (step 530).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A virtual reality apparatus comprising:
a plurality of vision sensors configured to detect objects in a vicinity of a user of the virtual reality apparatus; and
a processor coupled to the plurality of vision sensors and configured to:
compare a first object detected by a first vision sensor with a second object detected by a second vision sensor,
in response to the comparison, to:
identify the first detected object as a hand of the user;
differentiate the hand of the user from a hand of a person other than the user;
detect an arm of the user;
comparing a relative position of the detected hand and a relative position of the detected arm of the user, and
ignore hand gestures of the person other than the user.

2. The virtual reality apparatus as set forth in claim 1, wherein the processor is configured to detect the first detected object in an image captured by the first vision sensor and to identify the first detected object as a hand.

3. The virtual reality apparatus as set forth in claim 2, wherein the processor is configured to detect the second detected object in an image captured by the second vision sensor and to identify the second detected object as at least a portion of the arm of the user.

4. The virtual reality apparatus as set forth in claim 3, wherein the processor is configured to compare a relative position of the first detected object and a relative position of the second detected object in order to identify the first detected object as the hand of the user.

5. The virtual reality apparatus as set forth in claim 3, wherein the processor is configured to compare a relative movement of the first detected object and a relative movement of the second detected object in order to identify the first detected object as the hand of the user.

6. The virtual reality apparatus as set forth in claim 3, wherein the processor is configured to compare a relative alignment of the first detected object and a relative alignment of the second detected object in order to identify the first detected object as the hand of the user.

7. The virtual reality apparatus as set forth in claim 3, wherein the processor is further configured to compare a third object detected by the first vision sensor with the second object detected by the second vision sensor and, in response to the comparison, to identify the third detected object as the hand of the person other than the user.

8. The virtual reality apparatus as set forth in claim 3, wherein the first and second vision sensors comprise video cameras.

9. A method of operating a virtual reality apparatus comprising:
in a plurality of vision sensors, detecting objects in a vicinity of a user of the virtual reality apparatus;
comparing a first object detected by a first vision sensor with a second object detected by a second vision sensor;
in response to the comparison, identifying the first detected object as a hand of the user and differentiate the hand of the user from a hand of a person other than the user;
detecting an arm of the user;
comparing a relative position of the detected hand and a relative position of the detected arm of the user in; and
ignoring hand gestures of the person other than the user.

10. The method as set forth in claim 9, further comprising:
detecting the first detected object in an image captured by the first vision sensor; and
identifying the first detected object as a hand.

11. The method as set forth in claim 10, further comprising:
detecting the second detected object in an image captured by the second vision sensor; and identifying the second detected object as at least a portion of the arm of the user.

12. The method as set forth in claim 11, wherein identifying the first detected object as a hand of the user comprises:
comparing a relative position of the first detected object and a relative position of the second detected object in order to identify the first detected object as the hand of the user.

13. The method as set forth in claim 11, wherein identifying the first detected object as a hand of the user comprises:
comparing a relative movement of the first detected object and a relative movement of the second detected object in order to identify the first detected object as the hand of the user.

14. The method as set forth in claim 11, wherein identifying the first detected object as a hand of the user comprises:
comparing a relative alignment of the first detected object and a relative alignment of the second detected object in order to identify the first detected object as the hand of the user.

15. The method as set forth in claim 11, further comprising:
comparing a third object detected by the first vision sensor with the second object detected by the second vision sensor; and
in response to the comparison, identifying the third detected object as the hand of the person other than the user.

16. The method as set forth in claim 11, wherein the first and second vision sensors comprise video cameras.

17. A virtual reality (VR) headset configured to be worn by a user, the VR headset comprising:
a forward-looking vision sensor for detecting objects in a forward field of view of the VR headset;
a downward-looking vision sensor for detecting objects in a downward field of view of the VR headset;

a processor coupled to the forward-looking vision sensor and the downward-looking vision sensor and configured to:

detect a hand in a first image captured by the forward-looking vision sensor;

detect an arm of the user in a second image captured by the downward-looking vision sensor;

determine whether the detected hand in the first image is a hand of the user or a hand of a person other than the user;

compare a relative position of the detected hand in the first image and a relative position of the detected arm of the user in the second image; and ignore hand gestures of the person other than the user.

18. The virtual reality (VR) headset as set forth in claim 17, wherein the processor determines whether the detected hand in the first image is the hand of the user by comparing a relative movement of the detected hand in the first image and a relative movement of the detected arm of the user in the second image.

19. The virtual reality (VR) headset as set forth in claim 17, wherein the processor determines whether the detected hand in the first image is the hand of the user by comparing a relative alignment of the detected hand in the first image and a relative alignment of the detected arm of the user in the second image.

* * * * *